Aug. 29, 1961 A. PERRETTI 2,998,230
CENTRIFUGAL ATOMIZING DEVICE FOR LIQUID FUELS
Filed Feb. 17, 1959

United States Patent Office 2,998,230
Patented Aug. 29, 1961

2,998,230
CENTRIFUGAL ATOMIZING DEVICE FOR LIQUID FUELS
Attilio Perretti, 140 Rue des Postes, Lille, France
Filed Feb. 17, 1959, Ser. No. 793,824
Claims priority, application Germany July 29, 1958
7 Claims. (Cl. 261—30)

It is well known that the progress of the combustion of fuel-oils is the more perfect and effective as the mixture air and fuel is made more intimate.

Technical researches and tests have stated that, to obtain a really intimate mixture, it is necessary to reach a true and perfect incorporation action of the air in the fuel since the results obtained by the collision of the air jets with the jets of fuel particles are not sufficient.

The object of the invention is to provide a device which carries into effect a mechanical process for the atomization of liquid fuels, acts upon the proper composition of the mixture and yields results much above the results obtained with all the known combustion or carburization devices. The mechanical process is worked out by means of a device subjecting the liquid fuel and the air to a powerful lamination action obtained by directing the fuel and the air through an annular space formed between a stationary surface and a coaxial rotating surface which is very close to the first surface, the two surfaces being for instances constituted by two conical pipes.

The fuel and the air are supplied, by gravity or under pressure, in the annular space between the stationary surface and the rotating surface, and due to the rotation speed, are subjected to very important mechanical stresses capable of mixing the air with the fuel.

The fuel particles adhering to the rotating wall under the action of the centrifugal force and of the friction move helicoidally inside the annular space, forming a very thin fuel film. Each fuel particle is subjected to a driving tangential force and to a radial centrifugal force, and the frictions appearing on the one hand between the fuel and the stationary and rotating surface and on the other hand between the fuel and the air, generate simultaneously a laminating of the fuel film and a strong stirring of air and fuel.

Thereby, the incorporation of air into the fuel, in devices having the same sizes, is the more energetic as the rotation speed is higher and as the gap in the annular space between the rotating surface and the stationary surface is smaller. Thanks to the very thin atomization of the fuel thus obtained and to its continuous mixing with the air, the above mentioned device works as an accelerator for the combustion phenomenon, thus allowing a complete combustion of the atomized fuel without any escape of non-burnt droplets.

According to the invention, the action of the device is highly increased if the rotating pipe is surrounded with two cylindrical concentric sleeves, the ends of which are about in the same plane as the outlet of the conical pipe and if the combustive air under pressure is sent in the two annular spaces thus formed, the radial thickness of the first space, between the rotating pipe and the first cylindrical sleeve, being smaller than the radial thickness of the space between the two cylindrical sleeves and the radial thickness of the first annular space preferably ranging about 1 mm.

It has been ascertained that it was of great advantage, in order to bring the mixture air and fuel to become more and more intimate and homogeneous and to obtain fuel particles having always smaller diameters, to attack with the air under pressure, the laminated fuel film when this fuel is just leaving the rotating surface and when, under the action of the centrifugal force, this fuel film comes into contact with an annular air jet on the outlet edge of the surface of the rotating tube.

Since the radial thickness of the inner gap through which passes the air under pressure to attack the fuel film is very small, the speed of this annular jet of air is very high and the atomization action exerted upon the fuel is very powerful. The fuel, thus atomized, mixes intimately with the complementary air blown through the outer annular passage.

This partition of the air which brings about the atomization in two concentric jets having different speeds can be obtained with a sleeve rigidly locked with the blades of a turbine, for instance when the rotating conical pipe is also driven in rotation by the turbine. This partition of the air can also be obtained by means of a stationary sleeve integral with the outer envelope when the rotation of the conical pipe is controlled by a shaft driven by a motor.

By way of example, two forms of embodiment of the device according to the invention are described hereafter and illustrated in the annexed drawing.

Figure 1:
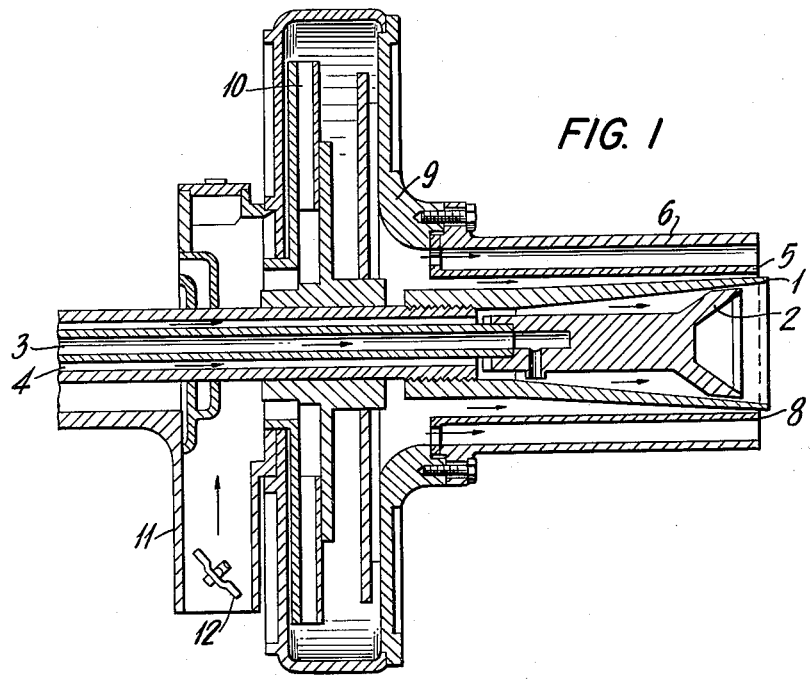
FIGURES 1 and 2 illustrate respectively in axial section, two forms of embodiment of the invention.

The device illustrated in FIGURE 1 is constituted by an atomizer formed by a divergent conical pipe 1 which can be driven in rotation and by a stationary body 2 inside said pipe, having its outer surface parallel and very close to the inner surface of the pipe 1, at least in the portion near the outlet of the pipe.

The fuel is introduced in the pipe 1 through a tube 3 and the air is introduced through a tube 4 but it is nevertheless also possible to introduce the air through the tube 3 and the fuel through the tube 4.

Two cylindrical sleeves 5, 6, are concentrically mounted outside the pipe 1 and serve as ducts for air which is supplied from the same source as the air passing through the pipe 1: the outlets of these two sleeves are substantially in the same plane as the outlet of pipe 1, or slightly set back. The radial thickness of the annular gap between the pipe 1 and the inner sleeve 5 is much smaller than the thickness of the annular gap between 5 and 6, so as to impart a much higher speed to the air jet passing through the inner annular gap.

The sleeve 6 is connected with the housing 9 of a compressor containing a rotor 10 fixed upon the tubular shaft 4 carrying the tapered pipe 1: the housing 9 is provided with a cap 11 which bears a regulating valve 12 and communicates with the radial channels of the rotor 10.

The shaft 4 is driven by a motor (not shown).

Figure 2:
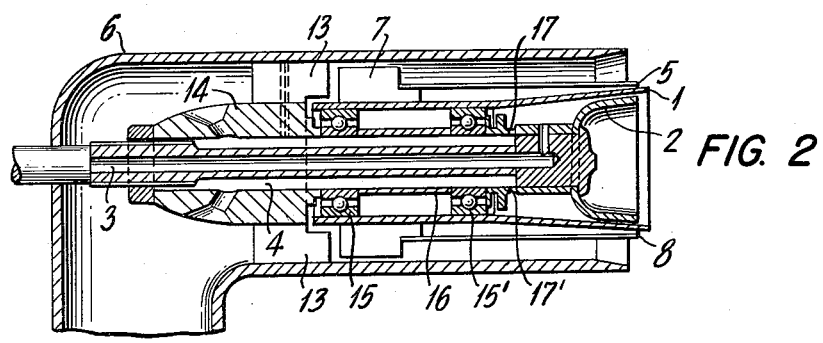

The same device is illustrated in FIGURE 2 but the pipe 1 driven by a turbine of which said pipe forms a part and mounted by means of bearings 15, 15' on the stationary tubular shaft 16, which communicates through channels 17, 17', with the inside of pipe 1.

The blades 7 of the rotor of the turbine are fixed by their inner edges to tube 1, whereas tube 5 is supported by said blades. Stationary guiding blades 13 are fixed by their outer edges on the stationary outer sleeve 6 and by their inner edges on a core 14 provided with a bore for the passing of the air and supported by the inner stationary tube 3.

The sleeve 6 communicates at the rear with an air compressor (not shown).

Figure 3:
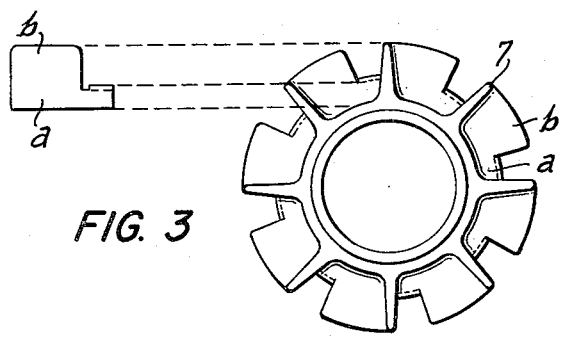
FIGURE 3 illustrates in cross section a part of the device of FIGURE 2.

The profile of the blades of the turbine 7 is a step profile (see FIGURE 3) and is constituted by two parts $a$, $b$, which, in practice, work like blades of two separate turbines: the part $a$, which has the smaller diameter, is comprised between the pipe 1 and the sleeve 5 fixed upon said part $a$, while the part $b$, which has the greater diameter, is comprised between the pipe 1 and the stationary sleeve 6 in which these blades rotate.

When the rotation is obtained by means of a motor, as in FIGURE 1, the inner cylindrical sleeve 5 can be stationary and rigidly connected to the outer sleeve 6.

This device works as follows: The fuel is introduced through the tube 3 in the rotating pipe 1, and the air is introduced through the tube 4 in said pipe 1.

Under action of the centrifugal force, the particles stick to the inner surface of the rotating pipe and move helically in the narrow gap between tube 1 and fixed member 2. A film of fuel is thereby formed on the inside surface of pipe 1 and this film becomes thinner as it progresses between pipe 1 and the stationary body 2 due to the increase of the diameter of the annular gap causing the film to be drawn: each particle of this film is subjected together with the air to a driving tangential force and to a radial centrifugal force and progresses in the annular gap 8 formed by the rotating pipe 1 and the stationary body 2: these particles and the air are subjected to the friction actions generated between fuel, air, rotating surface and stationary surface, causing a very strong mechanical mixing action to be obtained.

It is further provided, in order to force the fuel to become atomized in more and more smaller particles and to obtain a homogeneous mixture, that the fuel, when leaving the outlet edge of rotating pipe 1, shall be stricken by two air jets flowing out of the sleeves 5 and 6. The air source supplying the tube 4 supplies also these two air jets escaping from sleeves 5 and 6. The air jet escaping from sleeve 5 is intended to atomize the fuel and, due to the progressive decrease in its flowing passage section, flows to a much higher speed and strikes violently the fuel film radially discharged from the outlet edge of the rotating pipe 1. As a result, an exceedingly thin atomization is produced since the mixture thus produced is instantly added to the complementary air issuing from the outer sleeve 6 and intimately mixes with it. The sleeve 5 can be driven in rotation and be integral with the rotating pipe or can be stationary and be integral with the outer sleeve 6.

To figure the action exerted by the air issuing from the annular space between the pipe 1 and the sleeve 5, it can be stated that the thickness of this annular space must, preferably, be smaller than 1 mm., whereas the thickness of the annular space between sleeves 5, 6, has no action upon the atomization effects.

What I claim is:

1. A device for atomizing fuel-oils and intimately mixing them with combustion air, including a divergent conical pipe, a tubular shaft upon the end of which is fixed said pipe, means to drive in rotation said shaft, a stationary body disposed inside said pipe and having, at least in the part close to the outlet of said pipe, a conical shape so as to create an annular passage having a fairly constant radial thickness and an increasing diameter, a recessed axial hole provided in the inlet side of said stationary body, a tube connected to said hole and housed inside said tubular shaft, radial channels provided in said stationary body to connect said recessed hole with the annular space comprised between the stationary body and the rotating pipe, means to supply with liquid fuel said stationary tube, means to supply with air under pressure the annular space comprised between said stationary tube and the tubular shaft, two concentric cylindrical sleeves disposed around said rotating pipe and having their outlet apertures fairly in the outlet plane of said rotating pipe, the radial thickness of the space comprised between the rotating pipe and the first cylindrical sleeve being much smaller than the thickness of the annular space comprised between the first sleeve and the outer cylindrical sleeve, means to supply both sleeves with air under pressure.

2. A device for atomizing fuel-oils and intimately mixing them with combustion air, including a divergent conical pipe, a tubular shaft upon the end of which is fixed said pipe, means to drive in rotation said shaft, a stationary body disposed inside said pipe and having, at least in the part close to the outlet of said pipe, a conical shape so as to create an annular passage having a fairly constant radial thickness and an increasing diameter, a recessed axial hole provided in the inlet side of said stationary body, a tube connected to said hole and housed inside said tubular shaft, radial channels provided in said stationary body to connect said recessed hole with the annular space comprised between the stationary body and the rotating pipe, means to supply with liquid fuel said stationary tube, means to supply with air under pressure the annular space comprised between said stationary tube and the tubular shaft, two stationary concentric cylindrical sleeves disposed around said pipe and having their outlet apertures slightly set back in relation to the outlet of said pipe, the radial thickness of the annular space comprised between the rotating pipe and the inner cylindrical sleeve being smaller than the radial thickness of the annular space comprised between the two sleeves, a rotating compressor, the stator of which is interlocked with said sleeves and the rotor of which is fixed upon said tubular shaft, means to force the compressed air from said compressor into said annular passages provided between said sleeves and the inner sleeve and the rotating pipe, respectively, means to adjust the air supply at the inlet of said compressor.

3. A device for atomizing fuel-oils and intimately mixing them with combustion air, including a divergent conical pipe, a tubular shaft upon which said pipe is mounted so as to rotate freely, a stationary body inside said pipe and having, at least in the part close to the outlet of said pipe, a conical shape so as to form an annular passage having a fairly constant radial thickness and an increasing diameter, a recessed axial hole provided in the inlet side of said stationary body, a tube connected with said hole and housed inside said tubular shaft, radial channels provided in said stationary body to connect said recessed hole with said annular space, means to supply said tube with liquid fuel, a stationary cylindrical sleeve surrounding the conical pipe and having its outlet slightly set back from the outlet of said pipe, means to supply with air under pressure the other end of said sleeve, a core fixed upon the tubular shaft behind the rotating pipe, channels provided in said core and forming air inlets in the annular space comprised between the tubular shaft and the tube connected to the stationary body, side bores provided in the tubular shaft to connect said annular space with the inside of the rotating pipe, guiding blades, internally fixed on said core and externally fixed on the inner surface of the cylindrical sleeve, receiving blades fixed on the rear part of the rotating pipe, a second cylindrical sleeve surrounding said pipe and disposed between said pipe and the stationary outer sleeve, said second sleeve being fixed to said receiving blades, the radial thickness of the annular space comprised between said second sleeve and the rotating pipe being smaller than the radial thickness of the annular space comprised between the second rotating sleeve interlocked with the blades and the stationary outer sleeve.

4. A device for atomizing fuel-oils and intimately mixing them with combustion air, including a divergent conical pipe, a tubular shaft upon which said pipe is mounted so as to rotate freely, a stationary body inside said pipe and having, at least in the part close to the outlet of said pipe, a conical shape so as to form an annular passage having a fairly constant radial thickness and an increasing diameter, a recessed axial hole provided in the inlet side of said stationary body, a tube connected with said hole and housed inside said tubular shaft, radial channels provided in said stationary body to connect said recessed hole with said annular space, means to supply said tube with liquid fuel, a stationary cylindrical sleeve surrounding the conical pipe and having its outlet slightly set back from the outlet of said pipe, means to supply with air under pressure the other end of said sleeve, a core fixed upon the tubular shaft behind the rotating pipe, channels provided in said core and forming air inlets in the annular space comprised between the tubular shaft and the tube connected to the stationary body, side bores provided in the tubular shaft to connect said annular space with the inside of the rotating pipe, guiding blades, internally fixed on said core and externally fixed on the inner surface of the cylindrical sleeve, receiving blades fixed on the rear part of the rotating pipe, these receiving blades being step blades with a rear part having the greater diameter and a front part having the smaller diameter, a second cylindrical sleeve surrounding said pipe and disposed between said pipe and the stationary outer sleeve, said second sleeve being fitted upon the front part, having the smaller diameter of the receiving blades interlocked with the rotating pipe, the radial thickness of the annular space comprised between said second sleeve and the rotating pipe being smaller than the radial thickness of the annular space comprised between the second rotating sleeve interlocked with the blades and the stationary outer sleeve.

5. A device for atomizing fuel-oils and intimately mixing them with combustion air, comprising a divergent tapered tubular and rotatably arranged member, a shaft carrying said member, power means for positively driving said shaft and member, a stationary body arranged inside said tubular member and having a conical shape at least in its part located inside the widest part of said tubular member and extending substantially up to the outlet edge of said tubular member, whereby a narrow annular gap having a substantially constant radial thickness and an increasing diameter is formed between said stationary body and rotating member, means for supplying fuel-oil and compressed air into said annular gap, whereby a thin laminated film of fuel-oil mixed with air is radially discharged by the centrifugal action at the output edge of the rotating tubular member, two cylindrical sleeves, concentrically arranged around said rotating tubular member and extending substantially up to the outlet end thereof, the inner cylindrical sleeve forming with the rotating tubular member a narrow annular conduit having at its output section a radial thickness of the order of 1 mm. means to supply said narrow annular conduit with compressed air, whereby an atomizing air-jet of high velocity strikes the radially discharged film of fuel-oil, whereas the annular passage formed between both cylindrical sleeves has a larger section and means being provided to supply said outer annular passage with air under pressure whereby an annular jet of lower velocity is produced to dilute the fuel-oil atomized by the inner high velocity annular jet.

6. A device for atomizing fuel-oils and intimately mixing them with combustion air, comprising a divergent tapered tubular and rotatably arranged member, a shaft carrying said member, power means for positively driving said shaft and member, a stationary body arranged inside said tubular member and having a conical shape at least in its part located inside the widest part of said tubular member and extending substantially up to the outlet edge of said tubular member, whereby a narrow annular gap having a substantially constant radial thickness and an increasing diameter is formed between said stationary body and rotating member, means for supplying fuel-oil and compressed air into said annular gap, whereby a thin laminated film of fuel-oil mixed with air is radially discharged by the centrifugal action at the output edge of the rotating tubular member two stationary cylindrical sleeves concentrically arranged around said rotating member and having their outlet edge slightly set back with respect to the outlet edge of said tapered tubular member, the inner cylindrical sleeve forming with the rotating tubular member a narrow annular conduit having at its output section a radial thickness of the order of 1 mm. means to supply said narrow annular conduit with compressed air, whereby an atomizing air jet of high velocity strikes the radially discharged film of fuel-oil, whereas the annular passage formed between both cylindrical sleeves has a larger section and means being provided to supply said outer annular passage with air under pressure whereby an annular jet of lower velocity is produced to dilute the fuel-oil atomized by the inner high velocity annular jet.

7. A device for atomizing fuel-oils and intimately mixing them with combustion air, comprising a divergent tapered tubular and rotatably arranged member, a shaft carrying said member, power means for positively driving said shaft and member, a stationary body arranged inside said tubular member and having a conical shape at least in its part located inside the widest part of said tubular member and extending substantially up to the oulet edge of said tubular member, whereby a narrow annular gap having a substantially constant radial thickness and an increasing diameter is formed between said stationary body and rotating member, means for supplying fuel-oil and compressed air into said annular gap, whereby a thin laminated film of fuel-oil mixed with air is radially discharged by the centrifugal action at the output edge of the rotating tubular member two cylindrical sleeves concentrically arranged around said rotating member and having their outlet edge slightly set back with respect to the outlet edge of said tapered member, the inner sleeve being fixed to said tapered tubular member and rotatable therewith, whereas the outer sleeve is stationary arranged around the first, the inner cylindrical sleeve forming with the rotating tubular member a narrow annular conduit having at its output section a radial thickness of the order of 1 mm. means to supply said narrow annular conduit with compressed air, whereby an atomizing air jet of high velocity strikes the radially discharged film of fuel-oil, whereas the annular passage formed between both cylindrical sleeves has a larger section and means being provided to supply said outer annular passage with air under pressure whereby an annular jet of lower velocity is produced to dilute the fuel-oil atomized by the inner high velocity annular jet.

References Cited in the file of this patent

UNITED STATES PATENTS

| | | |
|---|---|---|
| 1,137,238 | Sherman | Apr. 27, 1915 |
| 1,767,305 | Musall | June 24, 1930 |